(12) United States Patent
Patil et al.

(10) Patent No.: US 9,014,069 B2
(45) Date of Patent: Apr. 21, 2015

(54) METHODS AND APPARATUS FOR COMMUNICATION MODE SELECTION BASED ON CONTENT TYPE

(71) Applicant: QUALCOMM Incorporated, San Diego, CA (US)

(72) Inventors: Shailesh Patil, Bridgewater, NJ (US); Hua Wang, Bridgewater, NJ (US); Juergen Cezanne, Ocean Township, NJ (US); Pablo A. Anigstein, Gillette, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/671,321

(22) Filed: Nov. 7, 2012

(65) Prior Publication Data

US 2014/0126437 A1 May 8, 2014

(51) Int. Cl.
*H04W 4/00* (2009.01)
*H04W 28/24* (2009.01)
*H04B 7/04* (2006.01)
*H04B 7/06* (2006.01)
*H04L 1/00* (2006.01)
*H04L 25/03* (2006.01)

(52) U.S. Cl.
CPC .............. *H04W 4/005* (2013.01); *H04L 1/0026* (2013.01); *H04L 25/03343* (2013.01); *H04L 1/00* (2013.01); *H04W 28/24* (2013.01); *H04B 7/0486* (2013.01); *H04B 7/0689* (2013.01)

(58) Field of Classification Search
CPC ...... G01C 21/206; G01S 19/21; G01S 5/0221; H04L 1/1812; H04L 1/1822; H04L 1/1825; H04L 1/1854; H04L 1/1867; H04W 72/04
USPC .......................... 370/254–350; 709/201–213
See application file for complete search history.

(56) References Cited

U.S. PATENT DOCUMENTS 7,230,931 B2 * 6/2007 Struhsaker .................... 370/280
8,064,372 B2 11/2011 Kim
(Continued)

FOREIGN PATENT DOCUMENTS

EP 2444875 A2 4/2012
WO WO-2012059555 A1 5/2012

OTHER PUBLICATIONS

International Search Report and Written Opinion—PCT/US2013/068877—ISA/EPO—Apr. 24, 2014.
(Continued)

*Primary Examiner* — Phirin Sam
*Assistant Examiner* — Debebe Asefa
(74) *Attorney, Agent, or Firm* — James K. O'Hare

(57) ABSTRACT

A method, an apparatus, and a computer program product for wireless communication are provided in connection with selection of a communication mode based on traffic type information. In one example, a network entity (e.g., a WiFi router, Picocell, Fentocell, an eNB, etc.) is equipped to obtain traffic type information for content to be transmitted by a network entity, determine a communication mode to use for transmission of the content based on the traffic type information, and transmit the content using the determined communication mode. In an aspect, the traffic type information may indicate that the content is a best effort traffic type, a latency sensitive traffic type, or no traffic type is available.

32 Claims, 10 Drawing Sheets

(56) References Cited

U.S. PATENT DOCUMENTS

| | | | |
|---|---|---|---|
| 8,111,709 B2* | 2/2012 | Hunukumbure et al. | 370/437 |
| 8,548,082 B2* | 10/2013 | Liao et al. | 375/267 |
| 8,750,205 B2* | 6/2014 | Chen et al. | 370/328 |
| 2009/0111457 A1* | 4/2009 | Struhsaker | 455/422.1 |
| 2009/0213765 A1 | 8/2009 | Rinne et al. | |
| 2011/0243079 A1* | 10/2011 | Chen et al. | 370/329 |
| 2011/0292843 A1 | 12/2011 | Gan et al. | |
| 2013/0194984 A1* | 8/2013 | Cheng et al. | 370/294 |

OTHER PUBLICATIONS

Jain R: "ATM Adaptation Layer", May 31, 2004, XP055113817, Retrieved from the Internet: URL: http://www.cse.wustl.edu/~jain/atm/ftp/atm_aal.pdf [retrieved on Apr. 11, 2014] p. 3.

NG, et al., "Dynamic Resource Allocation in MIMO-OFDMA Systems with Full-Duplex and Hybrid Relaying," IEEE Transactions on Communications, vol. 60, No. 5, May 2012, pp. 1291-1304.

* cited by examiner

METHODS AND APPARATUS FOR COMMUNICATION MODE SELECTION BASED ON CONTENT TYPE

BACKGROUND

The present disclosure relates generally to communication systems, and more particularly, to enabling a device to choose from among use of a multiple input multiple output (MIMO) diversity mode, a MIMO multiplexing mode, and a full duplex mode of communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Wi-Fi based access systems (e.g., IEEE 802.11 systems).

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Currently, due to the contention based nature of the scheduling of Wi-Fi, there can be severe delay/jitter associated with the streaming content. These delays are potentially exacerbated when multiple devices attempt to stream content through a Wi-Fi access point. Full duplex communication may reduce delay/jitter issues. As part of enabling full duplex communication, a device performs self interference cancellation. Cancellation of self interference (e.g., self interference cancellation) is not a trivial activity due to the presence of several impairments such as transmit and receive non-linearity, DC bias, phase noise, frequency offset, timing offset, self channel estimation, etc. In operation, a device's own channel needs to be accurately estimated to allow the device to cancel its transmission. Limits in a device's capability to perform self interference cancellation limit the range at which the gains of a full duplex device can be achieved. In other words, beyond a certain distance between a full duplex device and a transmitter the gains of full duplex communication diminish. Further, spatial multiplexing multiple input multiple output (MIMO) communication may not occur concurrently with full duplex communication. Full duplex communication may use multiple antennas and RF chains to assist with signal cancellation, so these same multiple antennas and RF chains may not also be used for spatial multiplexing.

Therefore, systems and methods to allow a device to choose from among use of one or more MIMO modes and a full duplex mode of communication may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with selection of a communication mode based on traffic type information. In one example, a network entity (e.g., a WiFi router, Picocell, Fentocell, an eNB, etc.) is equipped to obtain traffic type information for content to be transmitted by a network entity, determine a communication mode to use for transmission of the content based on the traffic type information, and transmit the content using the determined communication mode. In an aspect, the traffic type information may indicate that the content is a best effort traffic type, a latency sensitive traffic type, or no traffic type is available.

According to related aspects, a method for selection of a communication mode based on traffic type information is provided. The method can include obtaining traffic type information for content to be transmitted by a network entity. In an aspect, the traffic type information may indicate that the content is a best effort traffic type, a latency sensitive traffic type, or no traffic type is available. Further, the method can include determining a communication mode to use for transmission of the content based on the traffic type information. Moreover, the method may include transmitting the content using the determined communication mode.

Another aspect relates to a communications apparatus for selection of a communication mode based on traffic type information. The communications apparatus can include means for obtaining traffic type information for content to be transmitted by a network entity. In an aspect, the traffic type information may indicate that the content is a best effort traffic type, a latency sensitive traffic type, or no traffic type is available. Further, the communications apparatus can include means for determining a communication mode to use for transmission of the content based on the traffic type information. Moreover, the communications apparatus can include means for transmitting the content using the determined communication mode.

Another aspect relates to a communications apparatus. The apparatus can include a processing system configured to obtain traffic type information for content to be transmitted by a network entity. In an aspect, the traffic type information may indicate that the content is a best effort traffic type, a latency sensitive traffic type, or no traffic type is available. Further, the processing system may be configured to determine a communication mode to use for transmission of the content based on the traffic type information. Moreover, the processing system may further be configured to transmit the content using the determined communication mode.

Still another aspect relates to a computer program product, which can have a computer-readable medium including code for obtaining traffic type information for content to be transmitted by a network entity. In an aspect, the traffic type information may indicate that the content is a best effort traffic type, a latency sensitive traffic type, or no traffic type is available. Further, the computer-readable medium can include code for determining a communication mode to use for transmission of the content based on the traffic type information. Moreover, the computer-readable medium can include code for transmitting the content using the determined communication mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
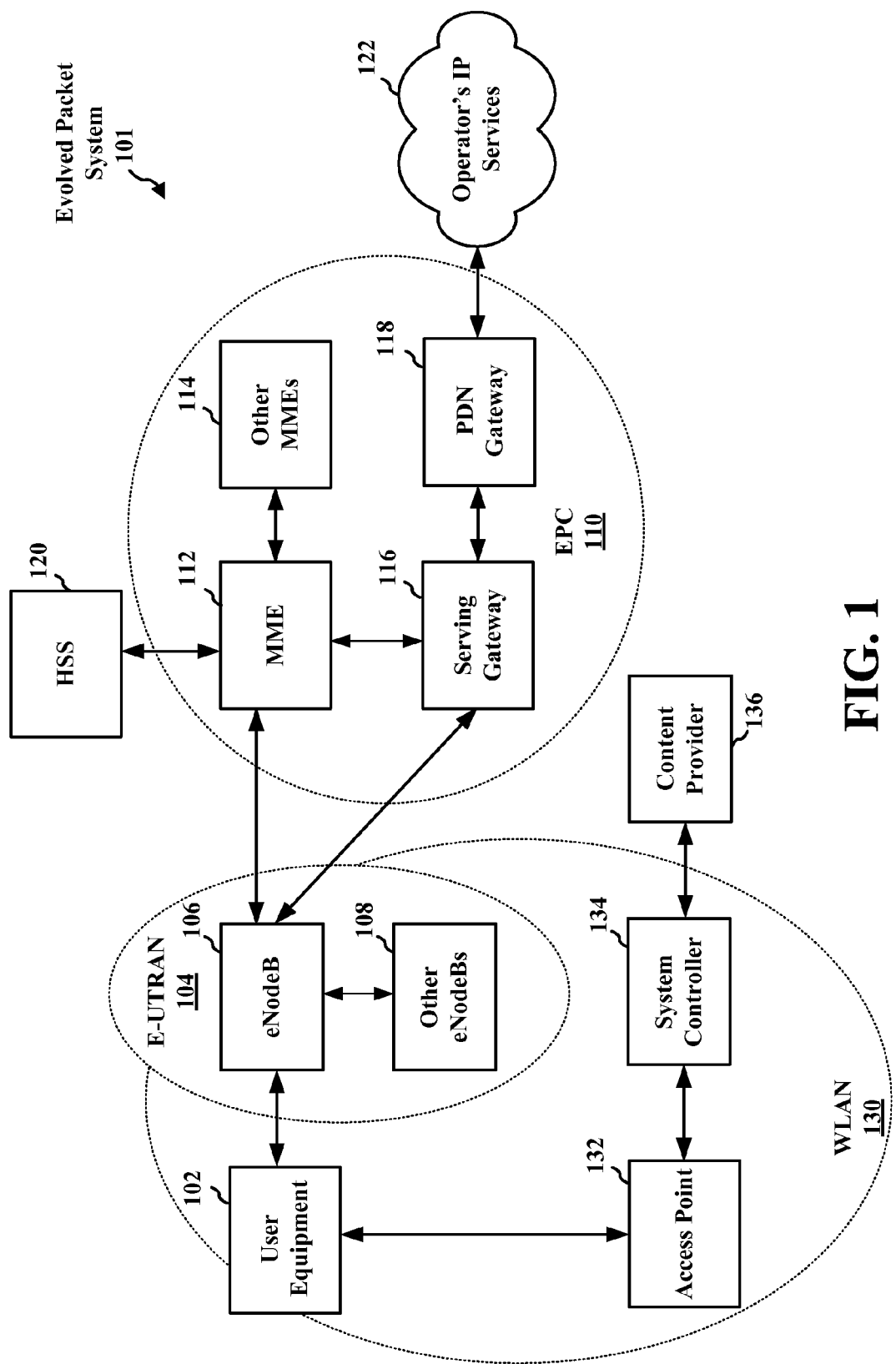
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating a network architecture 100 supporting LTE based communications a wireless local area network (WLAN) 130 based communications. The LTE network architecture may be referred to as an Evolved Packet System (EPS) 101. The EPS 101 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, such as but not limited to WLAN 130. As shown, the EPS 101 provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an Si interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

WLAN 130 may be an IEEE 802.11 network or some other type of network. WLAN 130 may implement one or more standards such as IEEE Std 802.11a, b, g, n, etc., and so on, which are known in the art. WLAN 130 may include one or more systems, depending on the deployment size of the WLAN. Each system may be identified by a service set identifier (SSID) that may be up to 32 bytes long. WLAN 130 includes one or more access points 132 that support communication for UE 102 within the coverage area of the WLAN 130. For a centralized architecture, a system controller 134 provides coordination and control for access point 132 in WLAN 130. In an operational aspect, WLAN 130 may provide an environment in which UE 102 may receive content via an access point 132. In such an aspect, the content may be provided by content provider 136.

Figure 2:
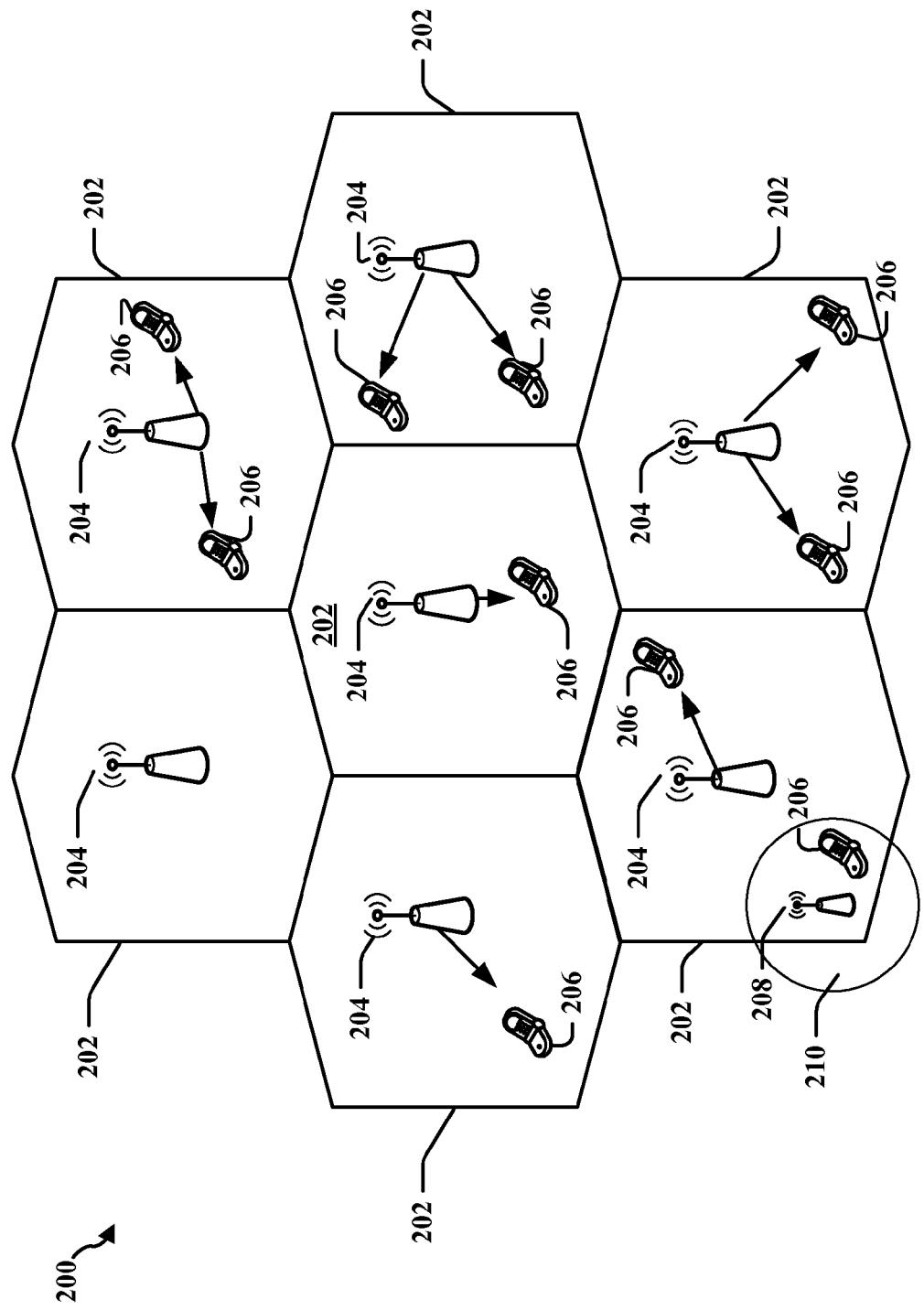
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
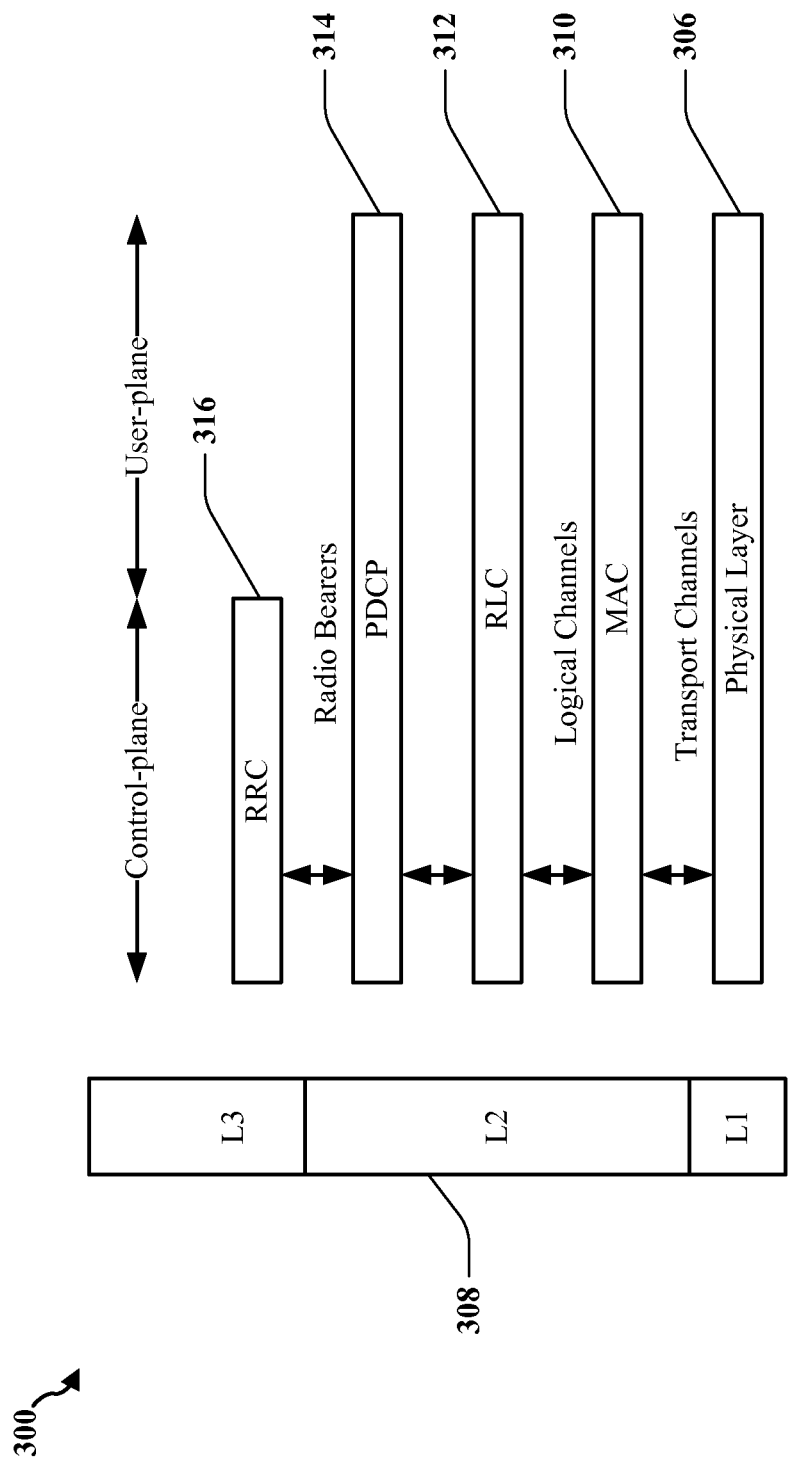
FIG. 3 is a diagram illustrating an example of a radio protocol architecture for the user and control planes.

FIG. 3 is a diagram 300 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 306. Layer 2 (L2 layer) 308 is above the physical layer 306 and is responsible for the link between the UE and eNB over the physical layer 306.

In the user plane, the L2 layer 308 includes a media access control (MAC) sublayer 310, a radio link control (RLC) sublayer 312, and a packet data convergence protocol (PDCP) 314 sublayer, which are terminated at the eNB on the network side. Although not shown, the UE may have several upper layers above the L2 layer 308 including a network layer (e.g., IP layer) that is terminated at the PDN gateway 118 on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNBs. The RLC sublayer 312 provides segmentation and reassembly of upper layer data packets, retransmission of lost data packets, and reordering of data packets to compensate for out-of-order reception due to hybrid automatic repeat request (HARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

In the control plane, the radio protocol architecture for the UE and eNB is substantially the same for the physical layer 306 and the L2 layer 308 with the exception that there is no header compression function for the control plane. The control plane also includes a radio resource control (RRC) sublayer 316 in Layer 3 (L3 layer). The RRC sublayer 316 is responsible for obtaining radio resources (e.g., radio bearers) and for configuring the lower layers using RRC signaling between the eNB and the UE.

Figure 4:
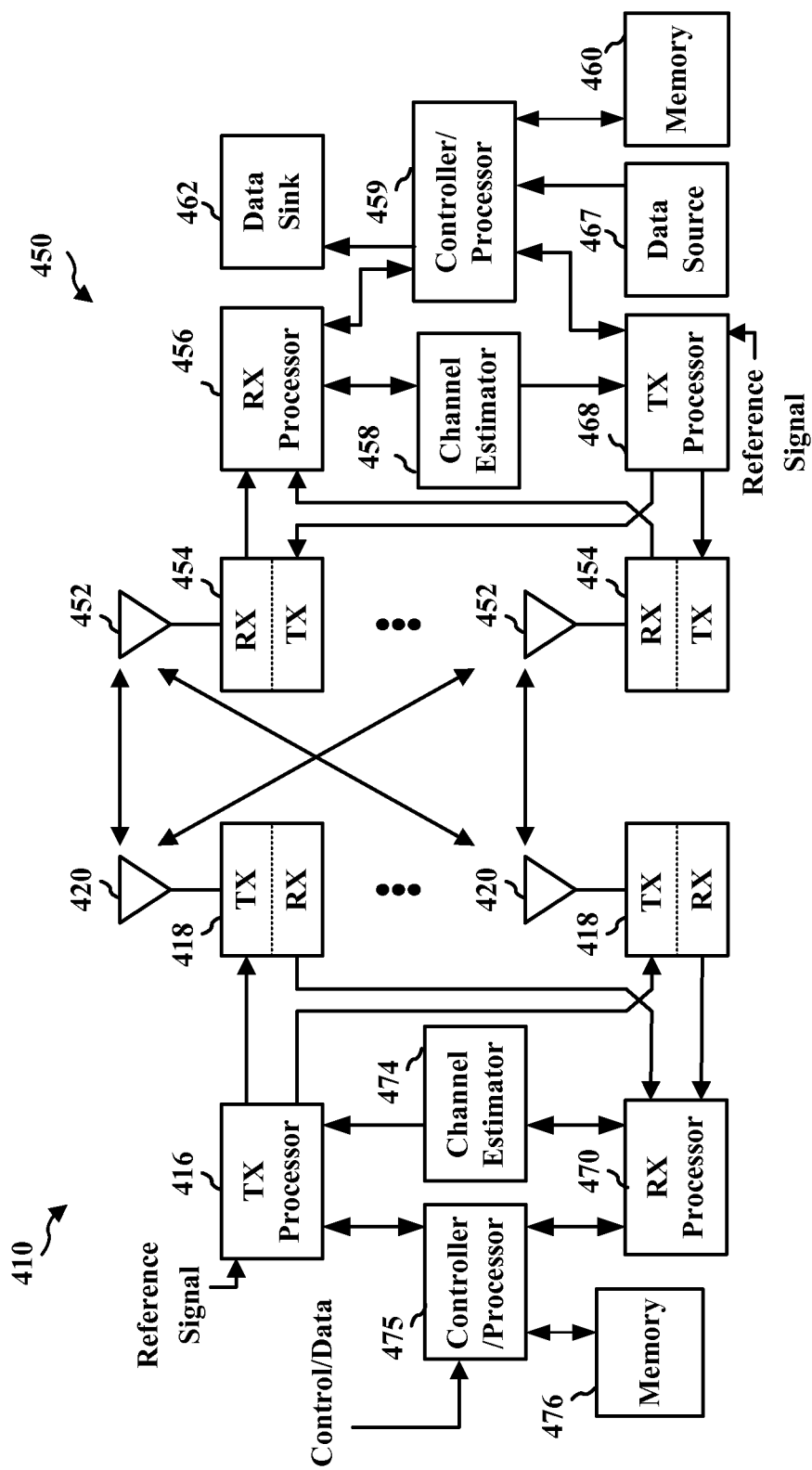
FIG. 4 is a diagram illustrating an example of an evolved Node B and user equipment in an access network.

FIG. 4 is a block diagram of a wide area network (WAN) entity 410 (e.g., WLAN access point, femto cell (e.g., home eNB (HeNB)), pico cell, micro cell, or remote radio head (RRH), etc.) in communication with a UE 450 in an access network. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the UE 450 based on various priority metrics. The controller/processor 475 is also responsible for HARQ operations, retransmission of lost packets, and signaling to the UE 450.

The transmit (TX) processor 416 implements various signal processing functions for the L1 layer (i.e., physical layer). The signal processing functions includes coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream is then provided to a different antenna 420 via a separate transmitter 418TX. Each transmitter 418TX modulates an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 performs spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the WAN entity 410. These soft decisions may be based on channel estimates computed by the channel estimator 458. The soft decisions are then decoded and deinterleaved to recover the data and control signals that were originally transmitted by the WAN entity 410 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the WAN entity 410, the controller/processor 459 implements the L2 layer for the user plane and the control plane by providing header compression, ciphering, packet segmentation and reordering, and multiplexing between logical and transport channels based on radio resource allocations by the WAN entity 410. The controller/processor 459 is also responsible for HARQ operations, retransmission of lost packets, and signaling to the WAN entity 410.

Channel estimates derived by a channel estimator 458 from a reference signal or feedback transmitted by the WAN entity 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RF carrier with a respective spatial stream for transmission.

The UL transmission is processed at the WAN entity 410 in a manner similar to that described in connection with the receiver function at the UE 450. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover upper layer packets from the UE 450. Upper layer packets from the controller/processor 475 may be provided to the core network. The controller/processor 475 is also responsible for error detection using an ACK and/or NACK protocol to support HARQ operations.

Figure 5:
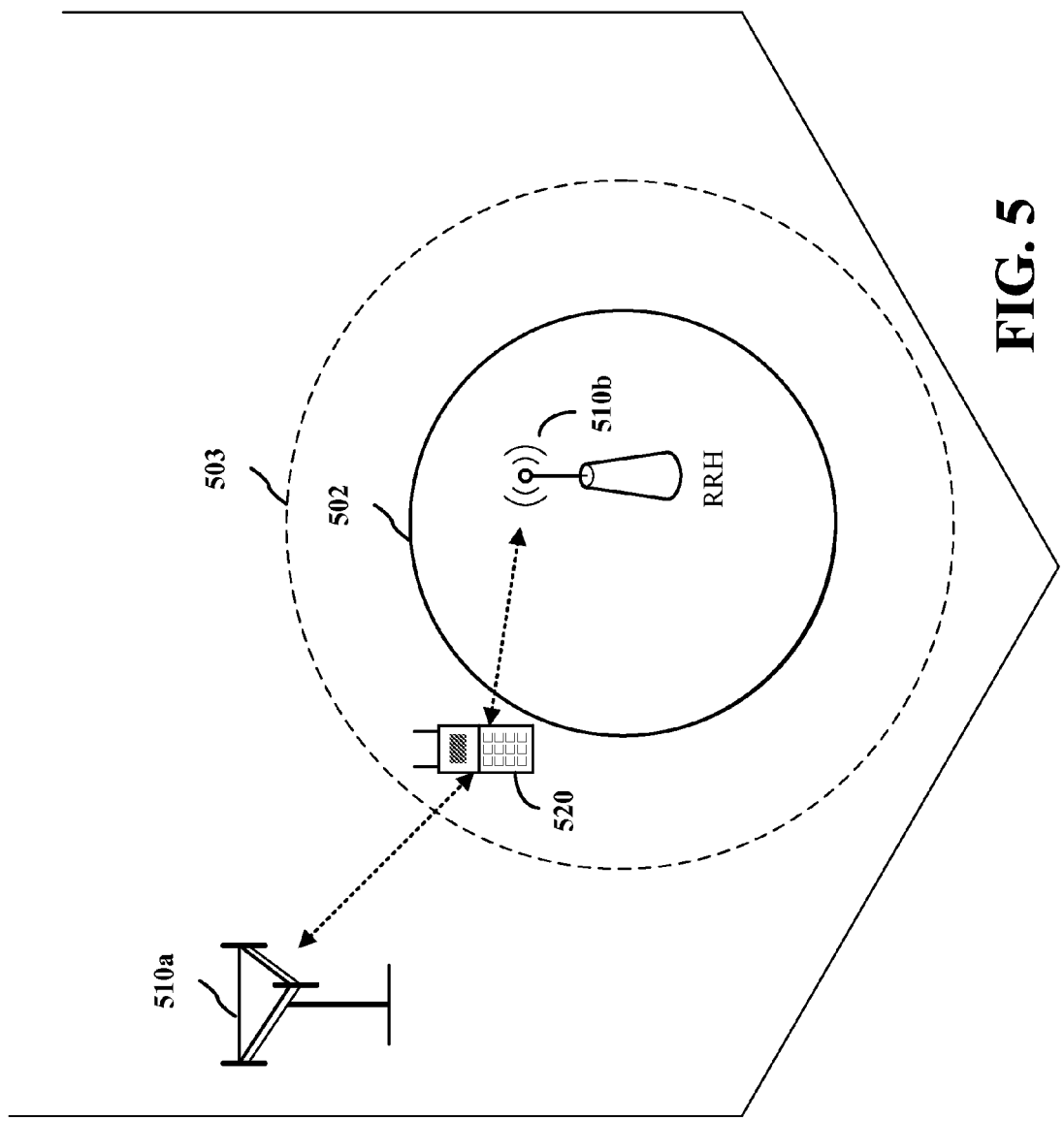
FIG. 5 is a diagram illustrating a range expanded cellular region in a heterogeneous network.

FIG. 5 is a diagram 500 illustrating a range expanded cellular region in a heterogeneous network. A lower power class eNB such as the RRH 510b may have a range expanded cellular region 503 that is expanded from the cellular region 502 through enhanced inter-cell interference coordination between the RRH 510b and the macro eNB 510a and through interference cancellation performed by the UE 520. In enhanced inter-cell interference coordination, the RRH 510b receives information from the macro eNB 510a regarding an interference condition of the UE 520. The information allows the RRH 510b to serve the UE 520 in the range expanded cellular region 503 and to accept a handoff of the UE 520 from the macro eNB 510a as the UE 520 enters the range expanded cellular region 503.

Figure 6:
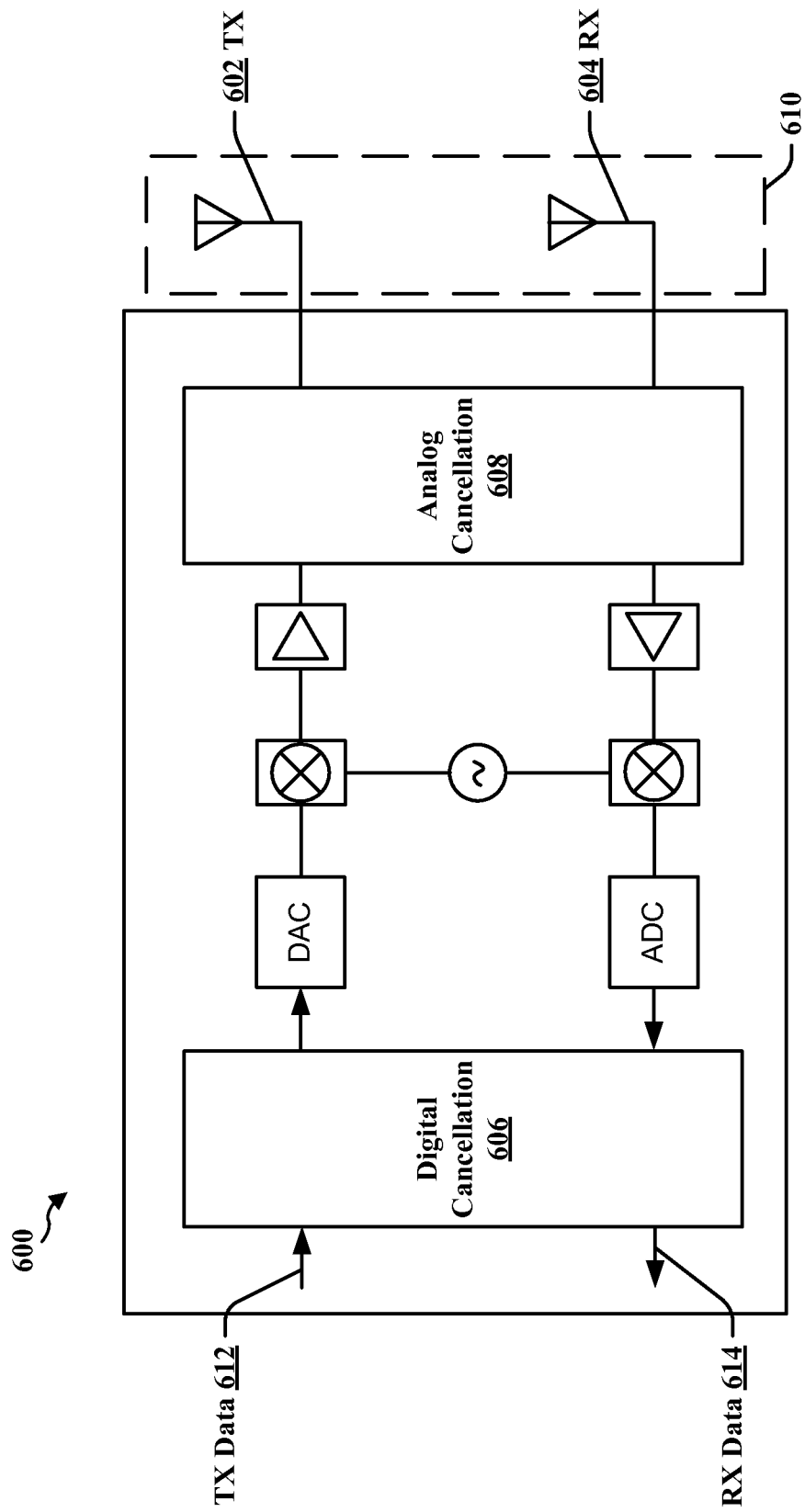
FIG. 6 is a diagram illustrating an apparatus with multiple antenna paths.

FIG. 6 is a diagram of an apparatus 600 with multiple communication paths. In an aspect, apparatus 600 may be a network entity (e.g., a WiFi router, Picocell, Fentocell, an eNB, etc.), or a UE.

Apparatus 600 include various components to assist with signal analysis. In an aspect, reception and process data (RX data 614) via one or more antennas (602, 604), where the apparatus may also be attempting to communicate data (TX data 612), may be effectuated through use of various self interference cancellation schemes. In such an aspect, self-cancellation may be performed through digital cancellation 606, analog cancellation 608, antenna isolation/cancellation 610, etc.

Figure 7:
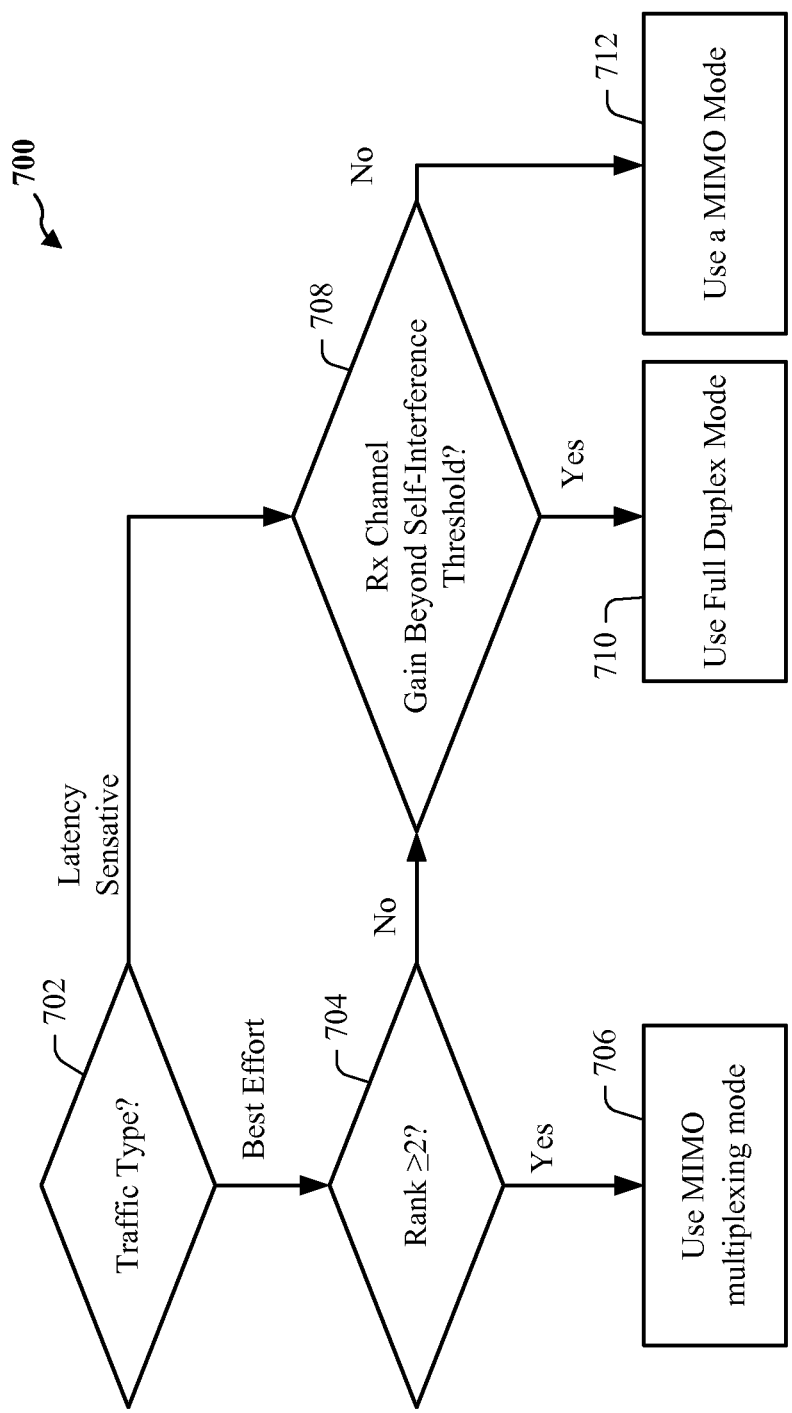
FIG. 7 is a flow chart of a method of wireless communication.
Figure 8:
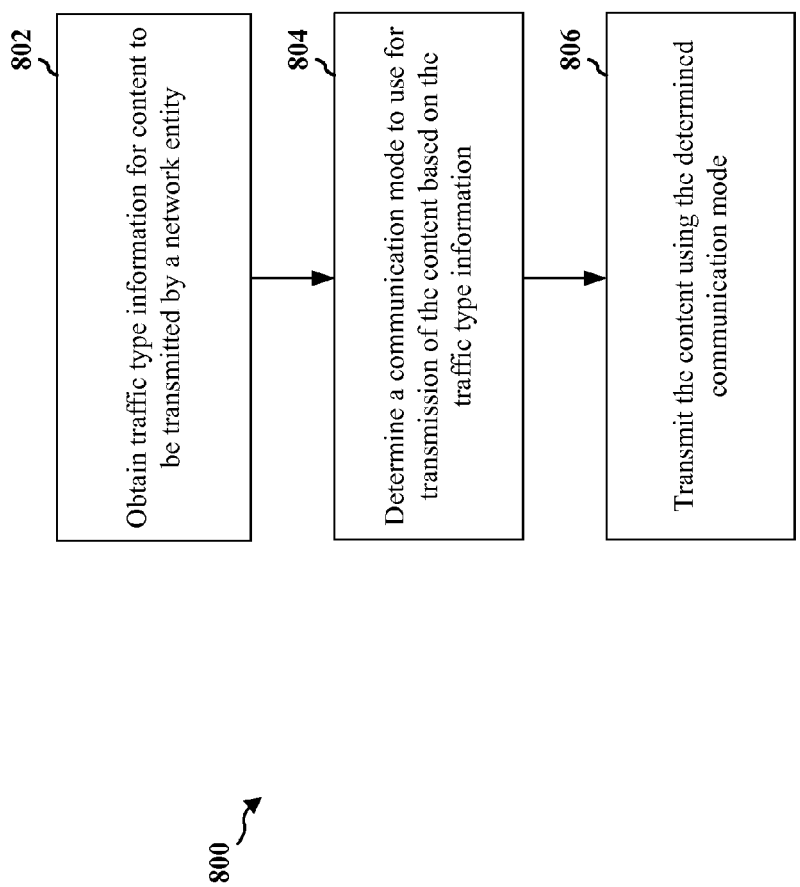
FIG. 8 is a flow chart of another method of wireless communication.

FIGS. 7 and 8 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 is a flow chart 700 of another method of wireless communication. The method may be performed by a network entity (e.g., a WiFi router, Picocell, Fentocell, an eNB, etc.).

At block 702, the network entity may determine a type of traffic that is available for transmission. In one aspect, a traffic type identifier may be included with the traffic to define the traffic type. Traffic types may include, but are not limited to, no traffic type, best effort traffic, latency sensitive traffic, etc.

If at block 702, the network entity determines that the traffic type is best effort traffic, then at block 704, the network entity determines the rank of the traffic type. As used herein, rank may refer to MIMO transmission schemes in which a rank 1 MIMO scheme uses one layer, a rank 2 MIMO transmission scheme uses two layers, and so on. If at block 704, the traffic is determined to be rank 2 or higher, then a block 706, a MIMO communication mode is used to transmit the traffic.

By contrast, if at block 704, the rank is determined to be 1 and/or if at block 702, the traffic type is determined to be latency sensitive (or no traffic type), then at block 708, the channel gain values for the receive channel and transmit channel are analyzed and the network entity determines whether the receive channel gain is beyond a threshold value of the self interference. In an aspect, the determination may be based at least in part on a transmit power and an amount of cancellation that may be achieved.

If at block 708, the network entity determines that the receive channel gain is beyond a threshold value of self interference, then at block 710, a full duplex mode of communications may be used.

By contrast, if at block 708, the network entity determines that the receive channel gain is not beyond a threshold value of self interference, then at block 712, a MIMO mode of communications may be used. In an aspect, the MIMO mode may be a multiplexing mode, a diversity mode, or any combination thereof. As used herein a MIMO multiplexing mode allows for different antennas to concurrently communicate different data streams. In such an aspect, MIMO multiplexing may allow a device to communicate at a comparatively higher data rate. Further, as used herein, a MIMO diversity mode allows for different antennas to concurrently communicate different instance of the same data. In such an aspect, MIMO diversity communicating may allow the device to provide data with a comparatively lower error rate (e.g., greater redundancy) and/or over a comparatively further range (e.g., range expansion). Further, the MIMO communication modes may be performed in a half-duplex manner (e.g., transmission than receptions).

FIG. 8 is a flow chart 800 of another method of wireless communication. The method may be performed by a network entity (e.g., a WiFi router, Picocell, Fentocell, an eNB, etc.).

At block 802, the network entity may obtain traffic type information for content to be transmitted by a network entity. In an aspect, the traffic type information indicates that the content may be a best effort traffic type, a latency sensitive traffic type, no traffic type is available, etc. In such an aspect, latency sensitive traffic may include content that is configured for streaming. Further, in such an aspect, best effort traffic content may include content that is configured for downloading. In another aspect, the traffic type information may be indicated through use of a traffic type identifier associated with the content.

At block 804, the network entity may determine a communication mode to use for transmission of the content based on the traffic type information. In an aspect, the communication mode may include a full duplex communication mode, one or more MIMO communication modes (e.g., diversity, multiplexing, etc.), etc. In an aspect in which the content is indicated to be a best effort traffic type, the determination may further include determining whether the content is configured for rank 2 or higher transmission, and enabling a MINO communication mode upon a determination that content is configured for rank 2 or higher transmission. In another aspect where the content is not configured for rank 2 or higher transmission, the determination may further include determining whether a receive channel gain is beyond a threshold value of self interference upon a determination that the traffic type is configured for rank 1 transmission (e.g., not rank 2 or higher). In such an aspect, the network device may enable a full duplex communication mode upon a determination that the receive channel gain is beyond the threshold value of self interference, or may enable a MIMO communication multiplexing mode or a MIMO communication diversity mode upon a determination that the receive channel gain is not beyond the threshold value of self interference. In an aspect in which the content is indicated to be a latency sensitive type, the determination may further include determining whether a receive channel gain is beyond a threshold value of self interference upon a determination that the traffic type is configured for rank 1 transmission. In such an aspect, the network device may enable a full duplex communication mode upon a determination that the receive channel gain is beyond the threshold value of self interference, or may enable a MIMO communication multiplexing mode or a MIMO communication diversity mode upon a determination that the receive channel gain is not beyond the threshold value of self interference. In an aspect in which the no content type is indicated, the determination may further include determining whether a receive channel gain is beyond a threshold value of self interference upon a determination that the traffic type is configured for rank 1 transmission. In such an aspect, the network device may enable a full duplex communication mode upon a determination that the receive channel gain is beyond the threshold value of self interference, or may enable a one or more MIMO communication modes (e.g., diversity, multiplexing, etc.) upon a determination that the receive channel gain is not beyond the threshold value of self interference.

At step 806, the network entity may transmit the content using the determined communication mode.

Figure 9:
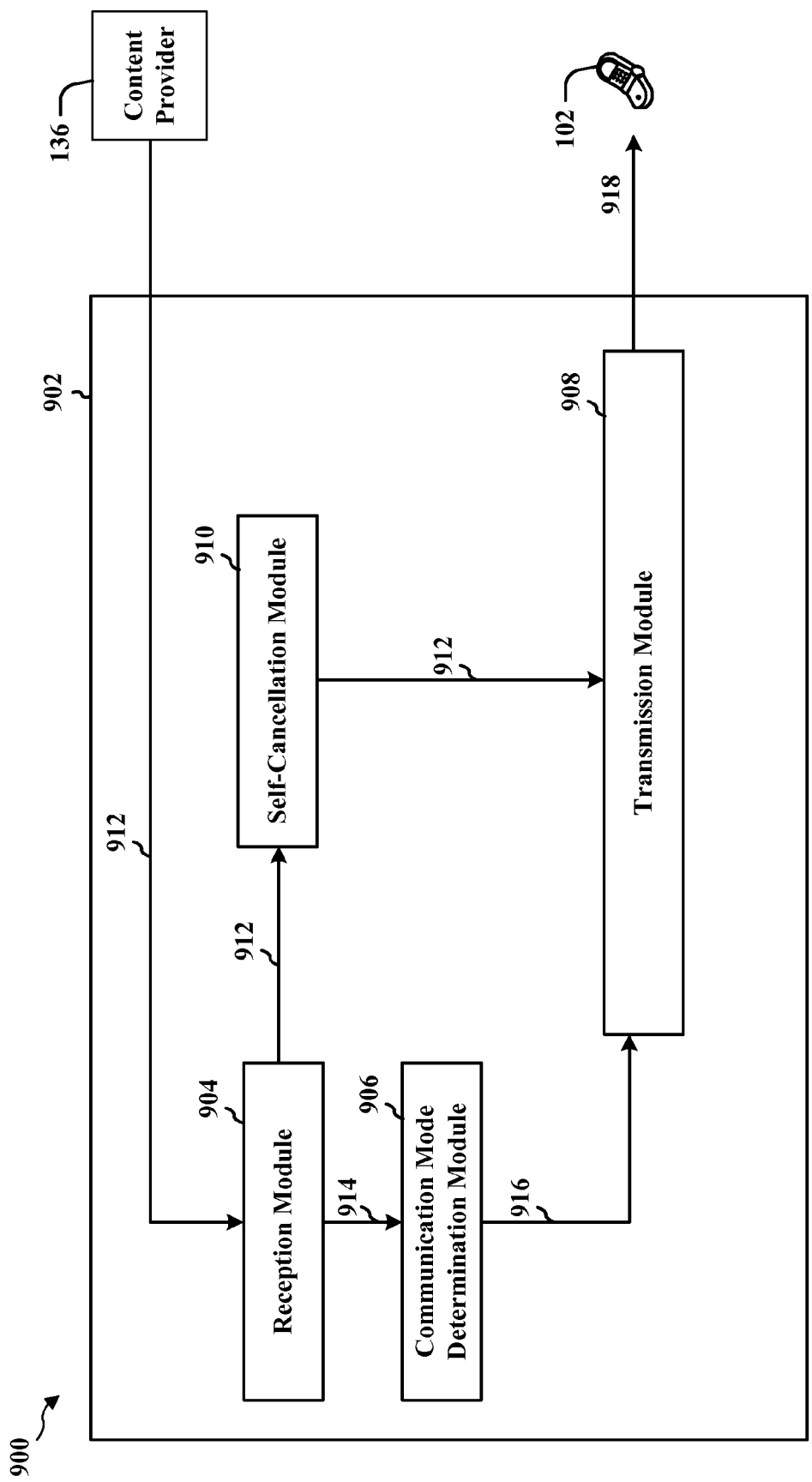
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a network entity (e.g., a WiFi router, Picocell, Fentocell, an eNB, etc.).

The apparatus 902 includes a reception module 904 that may receive content 912 from a content provider (e.g., 136). In an aspect, the received content 912 may further include a traffic type indicator 914. The apparatus 902 further includes communication mode determination module 906 that may be configured to determine a communication mode 916 to use for transmission of the content 912 based at least in part of a traffic type of the content. In an aspect, content 912 received via reception module 904 may be provided to at least one of self-cancellation module 910 or communication mode determination module 906. In another aspect, reception module 904 may provide one or more receive channel gain values to communication mode determination module 906. In such an aspect, communication mode determination module 906 may further analyze receive channel gain information as part of the communication mode 916 determination. In an aspect, the communication modes may include a full duplex communication mode, one or more MIMO communication modes (e.g., diversity, multiplexing, etc.), etc. Apparatus 902 may further include transmission module 908 that may be configured to transmit content 918 based on the received content 912 using the determined communication mode 916.

The apparatus may include additional modules that perform each of the steps of the algorithm in the aforementioned flow charts of FIGS. 7 and 8. As such, each step in the aforementioned flow charts of FIGS. 7 and 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
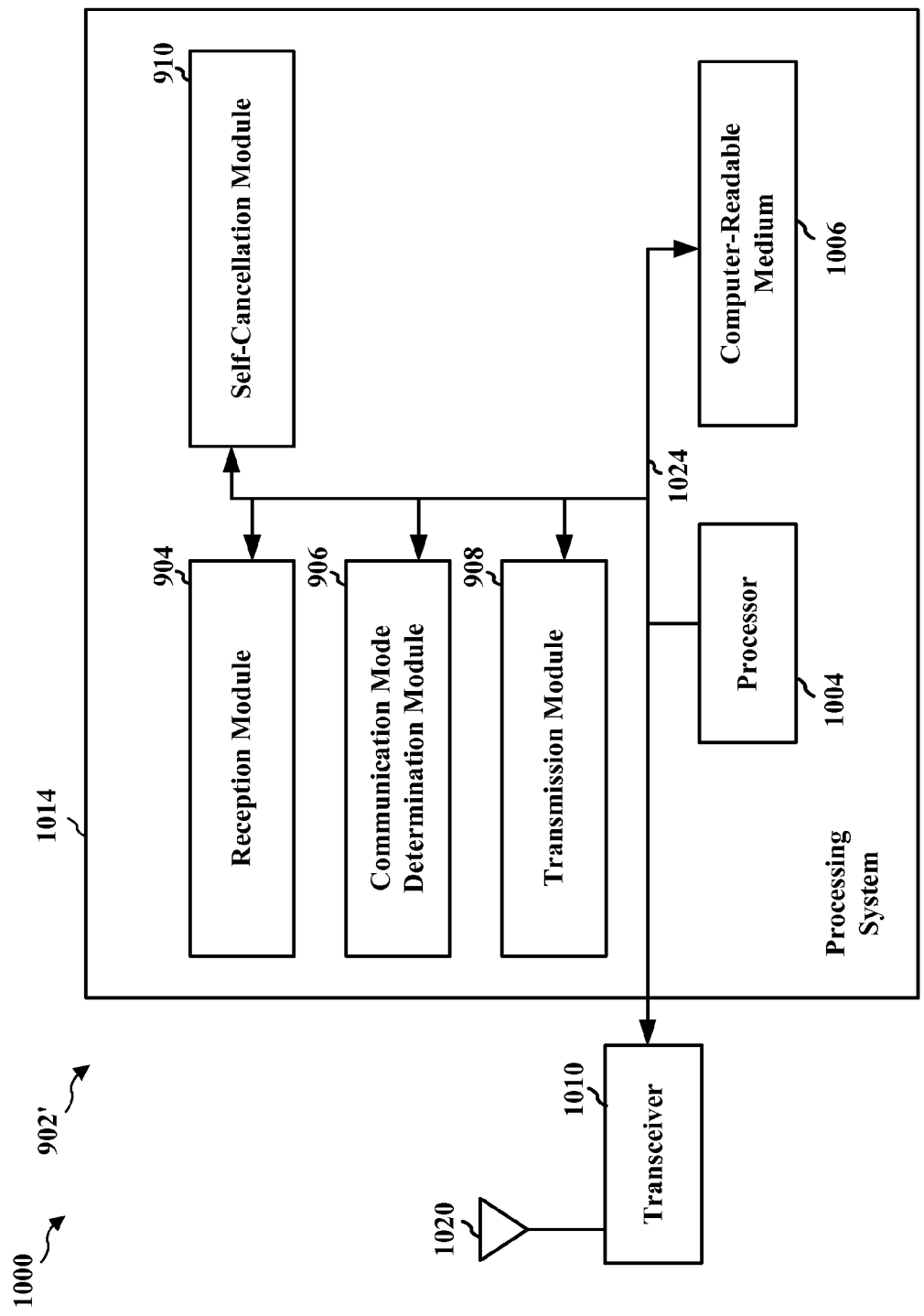
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, and 908. The modules may be software modules running in the processor 1004, resident/stored in the computer-readable medium 1006, one or more hardware modules coupled to the processor 1004, or some combination thereof. The processing system 1014 may be a component of the WAN entity 410 and may include the memory 476 and/or at least one of the TX processor 416, the RX processor 470, and the controller/processor 475.

In one configuration, the apparatus 902/902' for wireless communication includes means for obtaining traffic type information for content to be transmitted by a network entity, means for determining a communication mode to use for transmission of the content based on the traffic type information, and means for transmitting the content using the determined communication mode. In an aspect, the traffic type information may indicate that the content is a best effort traffic type, a latency sensitive traffic type, no traffic type is available, etc. In an aspect, the apparatus 902/902' means for obtaining may be configured to obtain the traffic type information from a traffic type identifier associated with the content. In an aspect where the obtained traffic type information indicates that the content is the best effort traffic type, the apparatus 902/902' means for determining may be configured to determine whether the content is configured for rank 2 or higher transmission, and enable a MIMO communication mode upon a determination that the content is configured for rank 2 or higher. In such an aspect, apparatus 902/902' means for determining may be further configured to determine whether a receive channel gain is beyond a threshold value of self interference upon a determination that the traffic type is configured for rank 1 transmission, and enable a full duplex communication mode upon a determination that the receive channel gain is beyond the threshold value of self interference, or enable one or more MIMO communication modes (e.g., diversity, multiplexing, etc.) upon a determination that the receive channel gain is not beyond the threshold value of self interference. In an aspect where the obtained traffic type information indicates that the content is the latency sensitive traffic type, the apparatus 902/902' means for determining may be configured to determine whether a receive channel gain is beyond a threshold value of self interference, and enable a full duplex communication mode upon a determination that the receive channel gain is beyond the threshold value of self interference, or enable one or more MIMO communication modes (e.g., diversity, multiplexing, etc.) upon a determination that the receive channel gain is not beyond the threshold value of self interference. In an aspect where the obtained traffic type information indicates that no traffic type information is available, the apparatus 902/902' means for determining may be configured to determine whether a receive channel gain is beyond a threshold value of self interference, and enable a full duplex communication mode upon a determination that the receive channel gain is beyond the threshold value of self interference, or enable one or more MIMO communication modes (e.g., diversity, multiplexing, etc.) upon a determination that the receive channel gain is not beyond the threshold value of self interference. The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications, comprising:
    obtaining traffic type information for content to be transmitted by a network entity, wherein the traffic type information indicates that the content is a best effort traffic type, a latency sensitive traffic type, or no traffic type is available;
    determining a communication mode to use for transmission of the content based on the traffic type information; and
    transmitting the content using the determined communication mode,
    wherein, when the obtained traffic type information indicates that the content is the best effort traffic type, the determining further comprises:
        determining whether the content is configured for rank 2 or higher transmission;
        upon determining that the content is configured for rank 2 or higher transmission, enabling a multiple input multiple output (MIMO) multiplexing communication mode; and
        upon determining that the content is configured for rank 1 transmission:
            determining whether a receive channel gain is beyond a threshold value of self interference;
            upon determining that the receive channel gain is beyond the threshold value of self interference, enabling a full duplex communication mode; and
            upon determining that the receive channel gain is not beyond the threshold value of self interference, enabling the MIMO multiplexing communication mode or a MIMO diversity communication mode.

2. The method of claim 1, wherein the communication mode comprises the full duplex communication mode, the MIMO diversity communication mode, or the MIMO multiplexing communication mode.

3. The method of claim 1, wherein, when the obtained traffic type information indicates that the content is the latency sensitive traffic type, the determining the communication mode to use comprises:
    determining whether the receive channel gain is beyond the threshold value of self interference; and
    enabling the full duplex communication mode upon a determination that the receive channel gain is beyond the threshold value of self interference; or
    enabling the MIMO multiplexing communication mode or the MIMO diversity communication mode upon a determination that the receive channel gain is not beyond the threshold value of self interference.

4. The method of claim 1, wherein, when the obtained traffic type information indicates that no traffic type information is available, the determining the communication mode to use comprises:
    determining whether the receive channel gain is beyond the threshold value of self interference; and
    enabling the full duplex communication mode upon a determination that the receive channel gain is beyond the threshold value of self interference; or
    enabling the MIMO multiplexing communication mode or the MIMO diversity communication mode upon a determination that the receive channel gain is not beyond the threshold value of self interference.

5. The method of claim 1, wherein the network entity comprises a wireless relay, a WiFi router, Picocell, Fentocell, or an eNB.

6. The method of claim 1, wherein the latency sensitive traffic type includes content with a traffic type that is configured for streaming the content.

7. The method of claim 1, wherein the best effort traffic type includes content with a traffic type that is configured for downloading the content.

8. The method of claim 1, wherein the traffic type information is obtained from a traffic type identifier associated with the content.

9. An apparatus for communication, comprising:
means for obtaining traffic type information for content to be transmitted by a network entity, wherein the traffic type information indicates that the content is a best effort traffic type, a latency sensitive traffic type, or no traffic type is available;
means for determining a communication mode to use for transmission of the content based on the traffic type information; and
means for transmitting the content using the determined communication mode,
wherein, when the obtained traffic type information indicates that the content is the best effort traffic type, the means for determining the communication mode to use for transmission of the content is configured to:
determine whether the content is configured for rank 2 or higher transmission; and
upon determining that the content is configured for rank 2 or higher transmission, enable a multiple input multiple output (MIMO) multiplexing communication mode; and
upon determining that the content is configured for rank 1 transmission:
determine whether a receive channel gain is beyond a threshold value of self interference;
upon determining that the receive channel gain is beyond the threshold value of self interference, enable a full duplex communication mode; and
upon determining that the receive channel gain is not beyond the threshold value of self interference, enable the MIMO multiplexing communication mode or a MIMO diversity communication mode.

10. The apparatus of claim 9, wherein the communication mode comprises the full duplex communication mode, the MIMO diversity communication mode, or the MIMO multiplexing communication mode.

11. The apparatus of claim 9, wherein, when the obtained traffic type information indicates that the content is the latency sensitive traffic type, the means for determining the communication mode to use for transmission of the content is configured to:
determine whether the receive channel gain is beyond the threshold value of self interference; and
enable the full duplex communication mode upon a determination that the receive channel gain is beyond the threshold value of self interference; or
enable the MIMO multiplexing communication mode or the MIMO diversity communication mode upon a determination that the receive channel gain is not beyond the threshold value of self interference.

12. The apparatus of claim 9, wherein, when the obtained traffic type information indicates that no traffic type information is available, the means for determining the communication mode to use for transmission of the content is configured to:
determine whether the receive channel gain is beyond the threshold value of self interference; and
enable the full duplex communication mode upon a determination that the receive channel gain is beyond the threshold value of self interference; or
enable the MIMO multiplexing communication mode or the MIMO diversity communication mode upon a determination that the receive channel gain is not beyond the threshold value of self interference.

13. The apparatus of claim 9, wherein the network entity comprises a wireless relay, a WiFi router, Picocell, Fentocell, or an eNB.

14. The apparatus of claim 9, wherein the latency sensitive traffic type includes content with a traffic type that is configured for streaming the content.

15. The apparatus of claim 9, wherein the best effort traffic type includes content with a traffic type that is configured for downloading the content.

16. The apparatus of claim 9, wherein the traffic type information is obtained from a traffic type identifier associated with the content.

17. An apparatus for communication, comprising:
a processing system configured to:
obtain traffic type information for content to be transmitted by a network entity, wherein the traffic type information indicates that the content is a best effort traffic type, a latency sensitive traffic type, or no traffic type is available;
determine a communication mode to use for transmission of the content based on the traffic type information; and
transmit the content using the determined communication mode,
wherein, when the obtained traffic type information indicates that the content is the best effort traffic type, the processing system is further configured to:
determine whether the content is configured for rank 2 or higher transmission;
upon determining that the content is configured for rank 2 or higher transmission,
enable a multiple input multiple output (MIMO) multiplexing communication mode; and
upon determining that the content is configured for rank 1 transmission:
determine whether a receive channel gain is beyond a threshold value of self interference;
upon determining that the receive channel gain is beyond the threshold value of self interference, enable a full duplex communication mode; and
upon determining that the receive channel gain is not beyond the threshold value of self interference, enable the MIMO multiplexing communication mode or a MIMO diversity communication mode.

18. The apparatus of claim 17, wherein the communication mode comprises the full duplex communication mode, the MIMO diversity communication mode, or the MIMO multiplexing communication mode.

19. The apparatus of claim 17, wherein, when the obtained traffic type information indicates that the content is the latency sensitive traffic type, the processing system is configured to:
determine whether the receive channel gain is beyond the threshold value of self interference; and
enable the full duplex communication mode upon a determination that the receive channel gain is beyond the threshold value of self interference; or
enable the MIMO multiplexing communication mode or the MIMO diversity communication mode upon a determination that the receive channel gain is not beyond the threshold value of self interference.

20. The apparatus of claim 17, wherein, when the obtained traffic type information indicates that no traffic type information is available, the processing system is configured to:
   determine whether the receive channel gain is beyond the threshold value of self interference; and
   enable the full duplex communication mode upon a determination that the receive channel gain is beyond the threshold value of self interference; or
   enable the MIMO multiplexing communication mode or the MIMO diversity communication mode upon a determination that the receive channel gain is not beyond the threshold value of self interference.

21. The apparatus of claim 17, wherein the network entity comprises a wireless relay, a WiFi router, Picocell, Fentocell, or an eNB.

22. The apparatus of claim 17, wherein the latency sensitive traffic type includes content with a traffic type that is configured for streaming the content.

23. The apparatus of claim 17, wherein the best effort traffic type includes content with a traffic type that is configured for downloading the content.

24. The apparatus of claim 17, wherein the traffic type information is obtained from a traffic type identifier associated with the content.

25. A computer program product, comprising:
   a non-transitory computer-readable medium comprising code for:
   obtaining traffic type information for content to be transmitted by a network entity, wherein the traffic type information indicates that the content is a best effort traffic type, a latency sensitive traffic type, or no traffic type is available;
   determining a communication mode to use for transmission of the content based on the traffic type information; and
   transmitting the content using the determined communication mode,
   wherein, when the obtained traffic type information indicates that the content is the best effort traffic type, the code is further for:
      determining whether the content is configured for rank 2 or higher transmission;
      upon determining that the content is configured for rank 2 or higher transmission,
   enabling a multiple input multiple output (MIMO) multiplexing communication mode; and
      upon determining that the content is configured for rank 1 transmission:
         determining whether a receive channel gain is beyond a threshold value of self interference;
         upon determining that the receive channel gain is beyond the threshold value of self interference, enabling a full duplex communication mode; and
         upon determining that the receive channel gain is not beyond the threshold value of self interference, enabling the MIMO multiplexing communication mode or a MIMO diversity communication mode.

26. The computer program product of claim 25, wherein the communication mode comprises the full duplex communication mode, the MIMO diversity communication mode, or the MIMO multiplexing communication mode.

27. The computer program product of claim 25, wherein, when the obtained traffic type information indicates that the content is the latency sensitive traffic type, the code is further for:
   determining whether the receive channel gain is beyond the threshold value of self interference; and
   enabling the full duplex communication mode upon a determination that the receive channel gain is beyond the threshold value of self interference; or
   enabling the MIMO multiplexing communication mode or the MIMO diversity communication mode upon a determination that the receive channel gain is not beyond the threshold value of self interference.

28. The computer program product of claim 25, wherein, when the obtained traffic type information indicates that no traffic type information is available, the code is further for:
   determining whether the receive channel gain is beyond the threshold value of self interference; and
   enabling the full duplex communication mode upon a determination that the receive channel gain is beyond the threshold value of self interference; or
   enabling the MIMO multiplexing communication mode or the MIMO diversity communication mode upon a determination that the receive channel gain is not beyond the threshold value of self interference.

29. The computer program product of claim 25, wherein the network entity comprises a wireless relay, a WiFi router, Picocell, Fentocell, or an eNB.

30. The computer program product of claim 25, wherein the latency sensitive traffic type includes content with a traffic type that is configured for streaming the content.

31. The computer program product of claim 25, wherein the best effort traffic type includes content with a traffic type that is configured for downloading the content.

32. The computer program product of claim 25, wherein the traffic type information is obtained from a traffic type identifier associated with the content.

* * * * *